United States Patent
Tesauro et al.

(10) Patent No.: US 8,636,899 B2
(45) Date of Patent: Jan. 28, 2014

(54) VENTED ALARM APPARATUS FOR USE WITH A POOL SKIMMER BASKET

(76) Inventors: Frank Tesauro, Lambertville, NJ (US); Joseph Tesauro, Lambertville, NJ (US)

(*) Notice: Subject to any disclaimer, the term of this patent is extended or adjusted under 35 U.S.C. 154(b) by 359 days.

(21) Appl. No.: 13/134,834

(22) Filed: Jun. 17, 2011

(65) Prior Publication Data

US 2012/0006730 A1 Jan. 12, 2012

Related U.S. Application Data

(60) Provisional application No. 61/399,202, filed on Jul. 8, 2010, provisional application No. 61/456,807, filed on Nov. 12, 2010.

(51) Int. Cl.
*B01D 35/143* (2006.01)

(52) U.S. Cl.
CPC .................................. *B01D 35/1435* (2013.01)
USPC ........ 210/87; 210/167.12; 210/238; 210/472; 4/290; 4/496; 116/112

(58) Field of Classification Search
CPC .......................... E04H 4/1272; B01D 35/1435
USPC ............. 210/85, 86, 87, 776, 167.18, 167.19, 210/497.01, 472, 120, 167.12, 238; 4/496, 4/512, 290; 116/112
See application file for complete search history.

(56) References Cited

U.S. PATENT DOCUMENTS

| | | | |
|---|---|---|---|
| 2,697,999 A * | 12/1954 | Crookston et al. | 116/34 R |
| 3,469,700 A | 9/1969 | Johnson | |
| 3,910,840 A | 10/1975 | Adam | |
| 4,140,634 A | 2/1979 | Harry | |
| 5,106,492 A * | 4/1992 | Distinti et al. | 210/91 |
| 5,718,822 A * | 2/1998 | Richter | 210/90 |
| 5,830,350 A | 11/1998 | Voss et al. | |
| 6,071,403 A | 6/2000 | Usher | |
| 6,180,017 B1 | 1/2001 | Usher | |
| 6,422,623 B1 | 7/2002 | Thomas | |
| 6,592,756 B1 | 7/2003 | Felix, Jr. et al. | |
| 6,893,557 B2 | 5/2005 | Harris-Griffin et al. | |
| 6,966,079 B2 | 11/2005 | Stetson | |
| 7,076,813 B2 | 7/2006 | Stetson | |
| 7,309,088 B2 | 12/2007 | Fiore et al. | |

* cited by examiner

*Primary Examiner* — Terry Cecil
(74) *Attorney, Agent, or Firm* — Sperry, Zoda & Kane (57) ABSTRACT

A detachable vented signaling alarm apparatus is provided which is capable of being attached to a skimmer basket commonly used with pool skimming systems. There are many different configurations and sizes of skimmer baskets with which the present apparatus is capable of attachment merely by drilling a hole generally centrally in the skimmer basket bottom. The detachable signaling alarm may be readily removed from the skimmer basket for various reasons such as pool vacuuming or maintenance and includes a vented stem for minimizing damage to the basket when debris has accumulated therein. An alarm of any type can be used with the vent mechanism for indicating when the skimmer basket is substantially blocked by debris by generating of an alarm condition responsive to airflow through the vent.

20 Claims, 8 Drawing Sheets

FIG. 8 ed alarm apparatus for use
with a pool skimmer basket

The present utility application hereby formally claims priority of current pending U.S. Provisional Application No. 61/399,202 filed Jul. 8, 2010 on a "Reusable Pool Skimmer Basket Grasping means And Vent Apparatus" filed by the same inventors listed herein, namely, Frank Tesauro and Joseph Tesauro, and said referenced provisional application is hereby formally incorporated by reference as an integral part of the present application.

The present utility application here by also formally claims priority of current pending U.S. Provisional Application No. 61/456,807 filed Nov. 12, 2010 on an "Alarm Means For Use With Pool Skimmer Basket" filed by the same inventors listed herein, namely, Frank Tesauro and Joseph Tesauro, and said referenced provisional application is hereby formally incorporated by reference as an integral part of the present application.

BACKGROUND OF THE INVENTION

1. Field of the Invention

The present invention relates to skimmer baskets used with swimming pool skimming systems and, in particular, provides an alarm which is preferably audible but could be visible or tactile which is usable with a variety of different shapes of skimmer baskets used with different skimming systems. These skimming systems are commonly used with all types of residential and commercial swimming pools and are usually operated in order to remove debris that may accumulate in the pool water. The alarm of the present invention is used with a detachable venting system for skimmer baskets and minimizes damaging thereto when clogged with debris. The alarm can comprise any alarming device responsive to airflow which serves to amplify an alarm signal such as a conventional woodwind musical instrument or other musical instrument that can generate a signal such as a sound signal responsive to airflow thereto. This signaling will occur whenever the skimmer basket is at least partially blocked by debris.

2. Description of the Prior Art

Many devices have been patented for the purpose of enhancing the design and construction of skimmer baskets for use with swimming pools some of which deal with venting of skimmer baskets to prevent damaging thereof and to promote efficient operation thereof such as shown in U.S. Pat. No. 3,479,700 patented Sep. 30, 1969 to L. E. Johnson on a "Strainer And Flow-Directing Apparatus For Swimming Pool Floor Drains"; and U.S. Pat. No. 3,910,840 patented Oct. 7, 1975 to C. R. Adam and assigned to Cascade Industries, Incorporated on a "Valve Actuator"; and U.S. Pat. No. 4,140,634 patented to J. R. Harry on Feb. 20, 1979 on a "Swimming Pool Skimmer Shield"; and U.S. Pat. No. 5,830,350 patented Nov. 3, 1998 to G. A. Voss et al on a "Pool Skimmer Basket"; and U.S. Pat. No. 6,071,403 patented Jun. 6, 2000 to M. J. Usher on a "Pool Skimmer Basket Assembly Including A Buoyant Alarm"; and U.S. Pat. No. 6,180,017 patented Jan. 30, 2001 to M. J. Usher on a "Pool Skimmer Basket Assembly And Method"; and U.S. Pat. No. 6,422,503 patented Jul. 23, 2002 to R. Thomas on a "Skimmer Lid And Basket Lifting Tool"; and U.S. Pat. No. 6,592,756 patented Jul. 15, 2003 to J. P. Felix, Jr. et al and assigned to Cool Pool Solutions, Inc. on a "Swimming Pool Skimmer Basket Grasping means And Reversible Weight"; and U.S. Pat. No. 6,893,557 patented May 17, 2005 to K. D. Harris-Griffin et al and assigned to Kimberly D. Harris-Griffin on a "Skimmer Basket Weight"; and U.S. Pat. No. 6,966,079 patented Nov. 22, 2005 to M. A. Stetson on a "Pool Skimmer"; and U.S. Pat. No. 7,076,813 patented Jul. 18, 2006 to M. A. Stetson on a "Pool Skimmer"; and U.S. Pat. No. 7,309,088 patented Dec. 18, 2007 to S. Fiore et al on a "Collapsible Pool Skimmer Cover/Basket Retrieval Device".

SUMMARY OF THE INVENTION

The present invention provides a vented alarming system for use with any swimming pool basket wherein the basket includes a bottom and a side wall extending upwardly therefrom along with a basket upper edge which defines a chamber within the basket which is located above the basket bottom and within the basket side wall and below the basket upper edge. The basket side wall and the basket bottom will include perforations preferably uniformly distributed therewithin to facilitate filtration skimming as pool water passes therethrough.

The vented alarming apparatus of the present invention includes a detachable stem securable to the basket portion at a position extending therethrough. This detachable stem is at least partially hollow within the interior thereof to facilitate a main channel extending therethrough. The detachable stem further defines a lower opening and an upper opening in flowing communication with respect to one another and with respect to the main channel. The lower opening is positioned below the chamber and below the basket bottom. The upper opening is positioned above the basket bottom to facilitate venting responsive to debris being positioned within the chamber and to allow fluid flow through the basket bottom even when the perforations are blocked. This detachable stem further includes a detachable fitting assembly secured thereto and preferably extending downwardly therefrom to facilitate defining of the main channel extending through the detachable stem. The detachable fitting assembly is positioned such as to define the lower opening of the detachable stem at a position below the basket bottom responsive to attachment of the detachable stem with respect to the basket bottom and extending therethrough.

A sound amplifying mechanism is included which defines a sound channel means extending therethrough. This sound amplifying mechanism includes a sound inlet and at least one or more sound outlets which can be variously configured. The sound amplifying mechanism is attached to the detachable stem with the sound inlet thereof in fluid flow communication with respect to the upper opening of the detachable stem in order to facilitate receiving of increased air flow passing through the main channel. The sound amplifying mechanism is responsive to receiving increased air flow therethrough to can amplify an alarm signal which can be audible, visible or tactile or any other type of alarm signaling means.

It is an object of the present invention to provide a reusable pool skimmer basket alarm which sounds an alarm which generates sounds such as loud gurgling, or the sound of air traveling quickly through opening defined in the unit or can generate tones such as musical tones from a type of musical instrument used as the sound amplifying means It is an object of the present invention to provide a reusable pool skimmer basket alarm which includes an alarm which is caused by the magnification of the sound passing through small holes, or a slit or slits in the lower cap member or stem when the skimmer basket is clogged with debris. Moreover, the placement of vent holes, or slits in the vertical stem of this invention aids in the prevention of false or premature alarms.

It is an object of the present invention to provide a reusable pool skimmer basket alarm which provide a vacuum-break, air-powered alarm device deriving its usefulness only when air from above the water line flows down through the vertical tube exiting through the slit or aperture at the bottom, is reachable above the water line to allow a home owner or service technician to avoid having to come into contact with debris or dirty water in the skimmer basket during routine basket cleaning.

It is an object of the present invention to provide a reusable pool skimmer basket alarm which can be attached as an after-market item to skimmer baskets of many different configurations merely by the drilling of a small hole in the bottom portion thereof.

It is an object of the present invention to provide a reusable pool skimmer basket alarm made of sufficiently strong thermoplastic material resistant to the action of chemicals in the pool water and which can be used with a variety of skimmer baskets.

It is an object of the present invention to provide a reusable pool skimmer basket alarm which provides a means for disengaging the detachable alarm stem portion from the lower basket fitting to facilitate use of a vacuum pool cleaning system in the conventional manner using a vacuum plate fitted extending horizontally over the skimmer basket and across the upper basket edge with the stem detached temporarily from the basket.

It is an object of the present invention to provide a reusable pool skimmer basket alarm which in and of itself adds weight to the skimmer basket, thus eliminating basket floatation which is a commonly experienced problem with plain skimmer baskets.

It is an object of the present invention to provide a reusable pool skimmer basket alai in which sounds an alarm through a hollow tubular stem having holes or slits defined in the opposite ends thereof, preferably, without any having apertures defined in the hollow tubular member extending between the ends of the stem for enhancing the magnitude of the audible alarm.

It is an object of the present invention to provide a reusable pool skimmer basket alarm which sounds an alarm which is preferably audible.

It is an object of the present invention to provide a reusable pool skimmer basket alarm which generates an alarm which can be heard at a sufficient distance from the skimmer basket while under the skimmer cover, thus alerting the person who maintains the pool that the skimmer basket is substantially filled with debris, thus avoiding the possibility of pump or basket damage which can result from operation of the pool pump when the basket is obstructed by debris. The alarm will always sound before there has been skimmer basket or pump damage.

BRIEF DESCRIPTION OF THE DRAWING

While the invention is particularly pointed out and distinctly described herein, a preferred embodiment is set forth in the following detailed description which may be best understood when read in connection with the accompanying drawing, in which.

DETAILED DESCRIPTION OF THE PREFERRED EMBODIMENT

Figure 2:
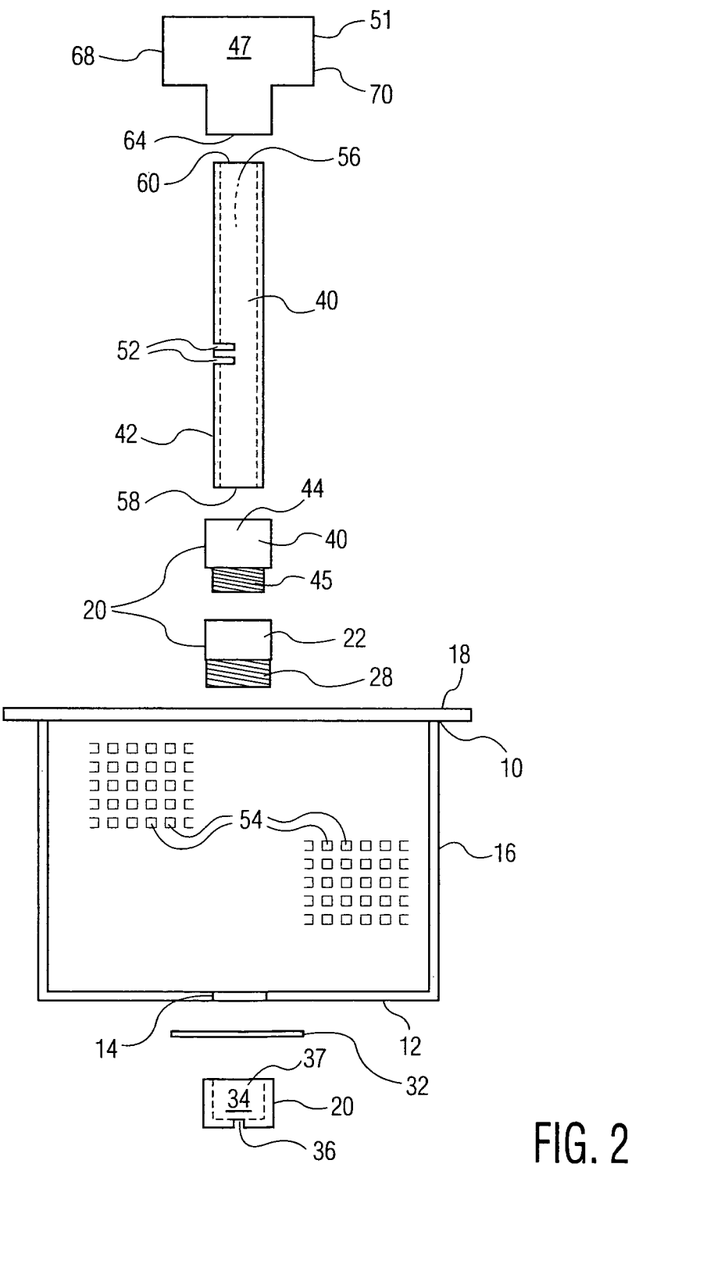
FIG. 2 illustrates an exploded front plan view of an embodiment of the skimmer basket alarm apparatus of the present invention as shown in FIG. 1 in vertical alignment with a skimmer basket.
Figure 3:
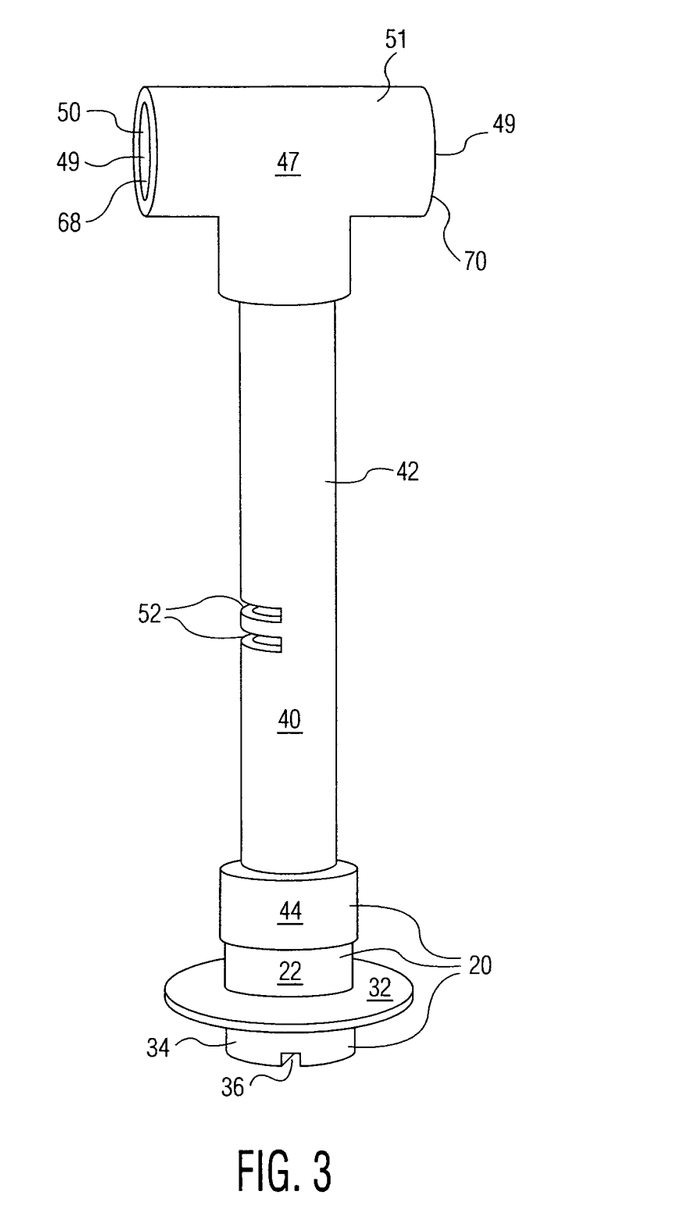
FIG. 3 illustrates a front perspective view of an embodiment of the skimmer basket alarm apparatus of the present invention as shown in FIG. 1.
Figure 4:
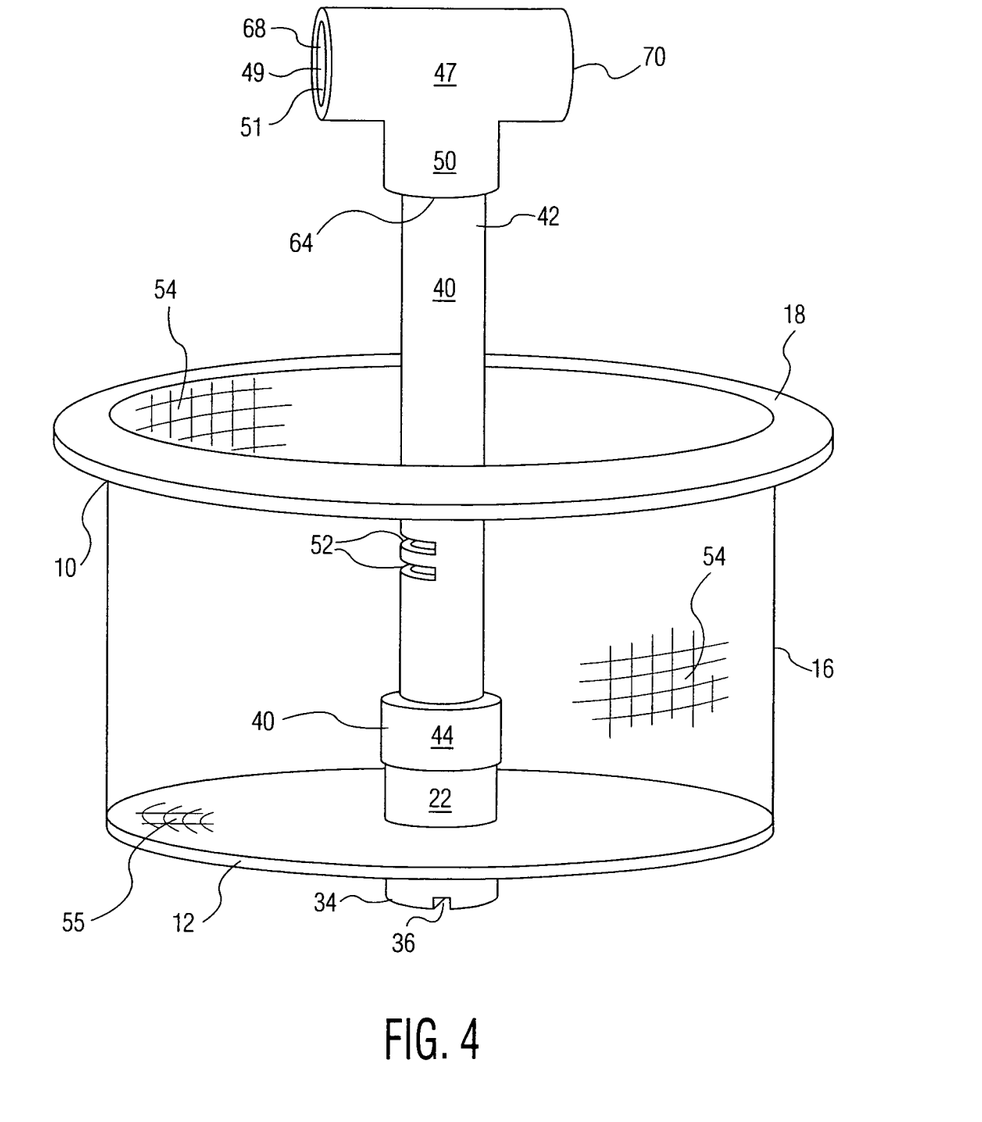
FIG. 4 illustrates an front perspective view of an embodiment of the skimmer basket alarm apparatus of the present invention as shown in FIG. 1 shown installed extending through the bottom of a skimmer basket.
Figure 5:
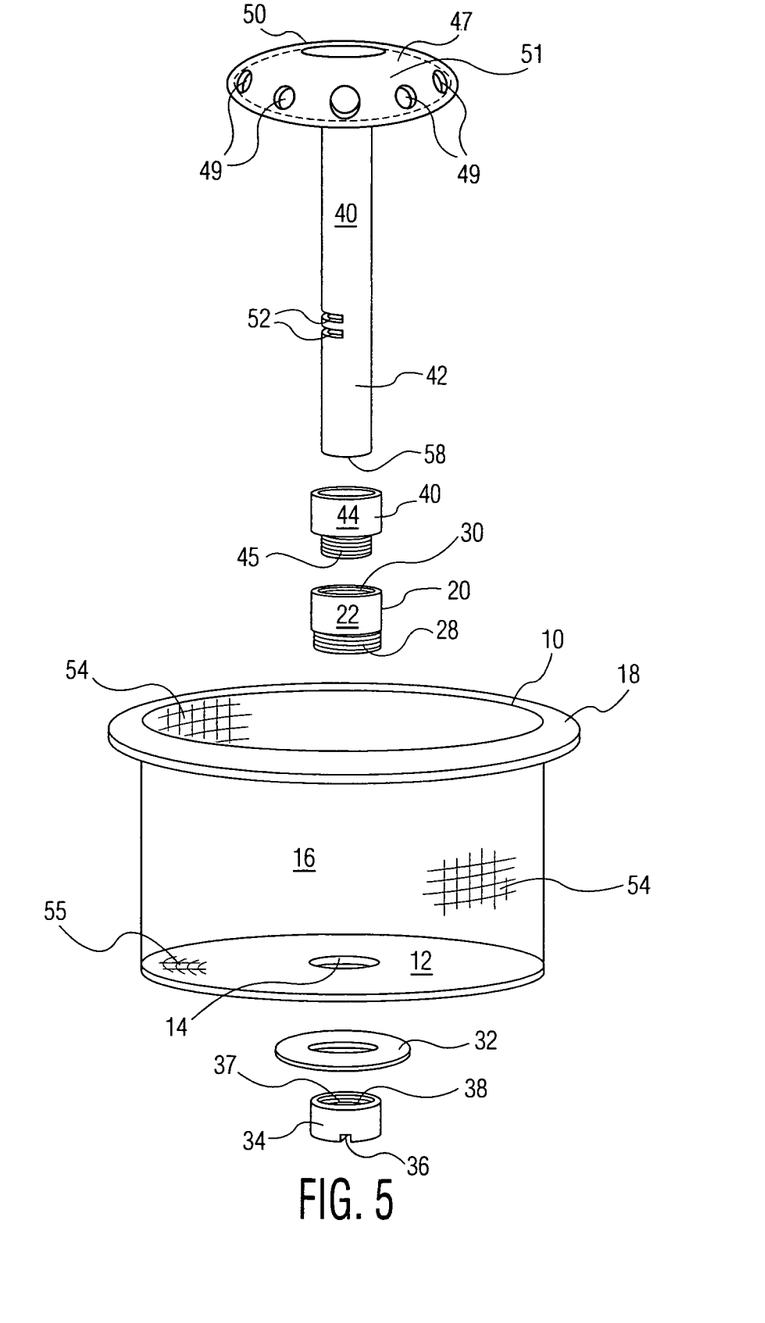
FIG. 5 illustrates an exploded front perspective view of an alternative embodiment of the skimmer basket alarm apparatus of the present invention in vertical alignment with a skimmer basket.
Figure 6:
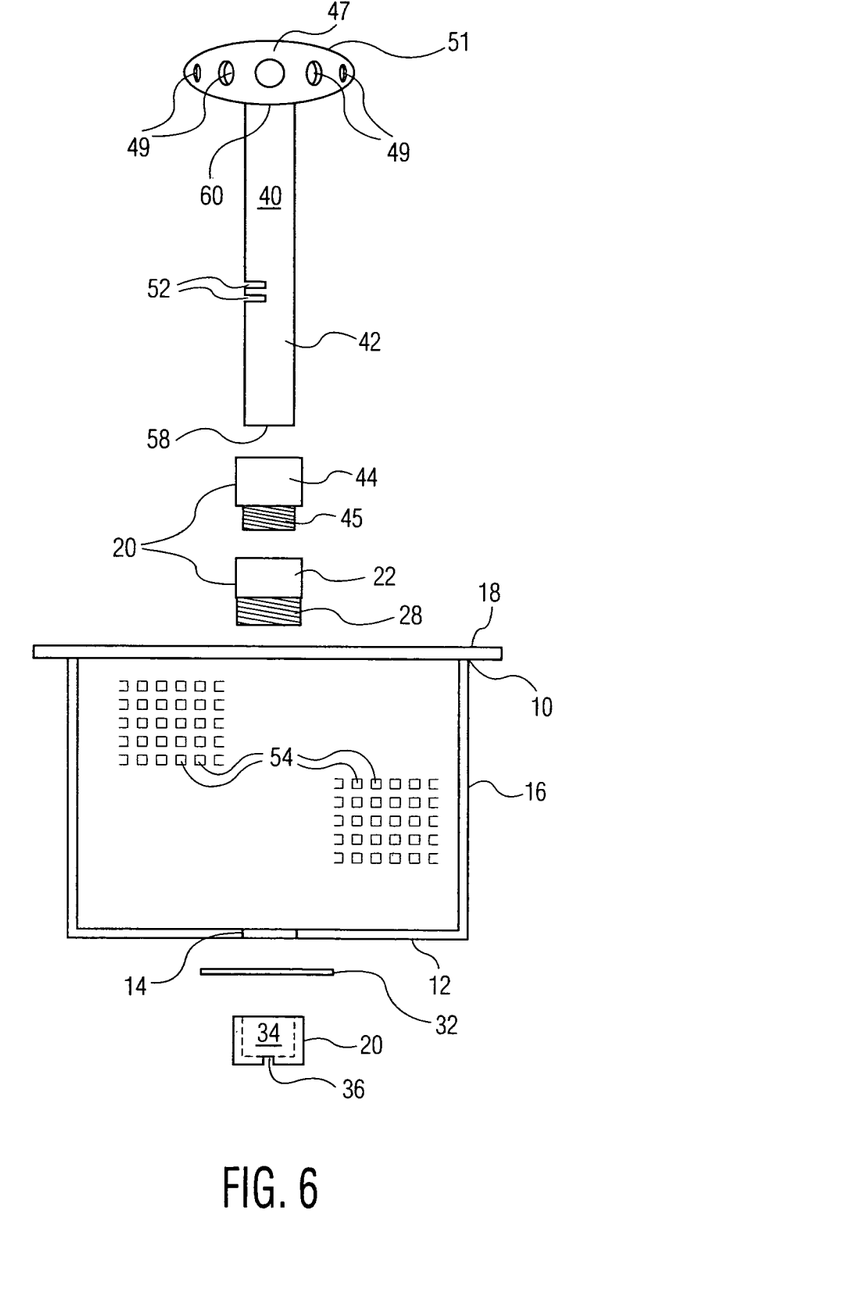
FIG. 6 illustrates an exploded front plan view of the alternative embodiment of the skimmer basket alarm apparatus of the present invention as shown in FIG. 5 in vertical alignment with a skimmer basket.
Figure 7:
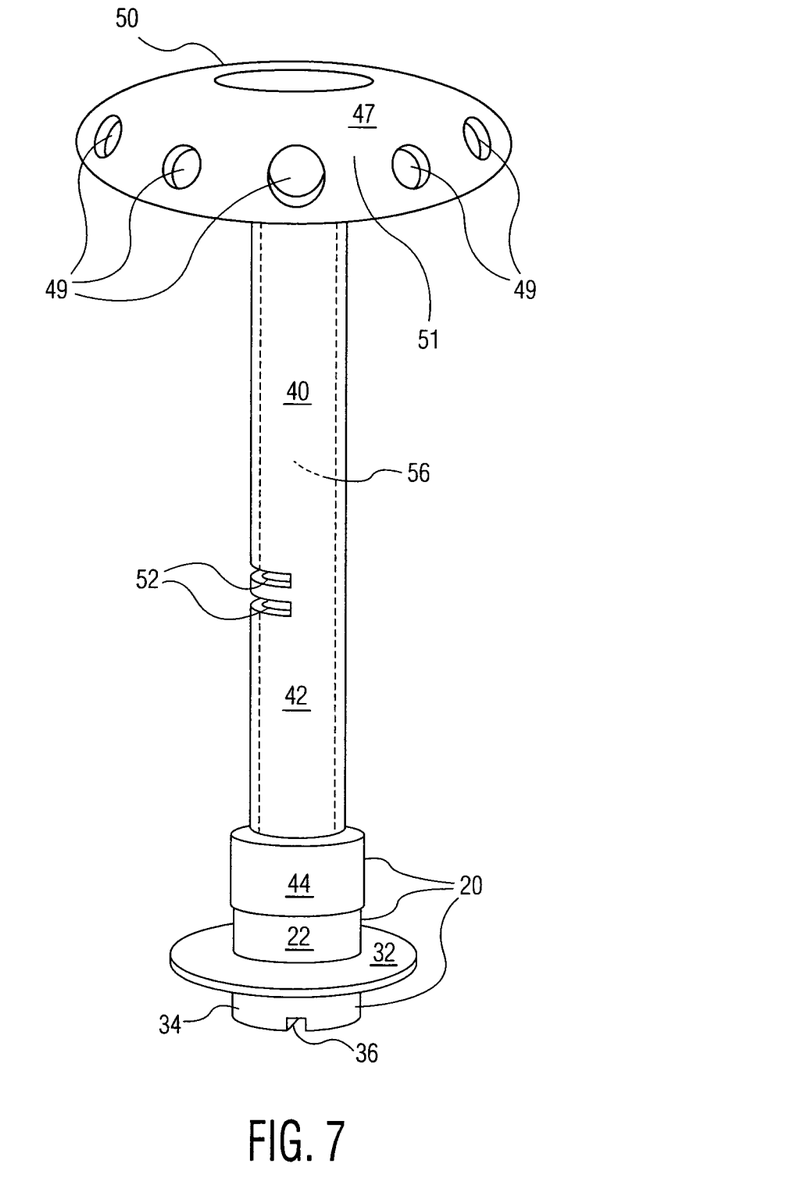
FIG. 7 illustrates a front perspective view of an alternative embodiment of the skimmer basket alarm apparatus of the present invention as shown in FIG. 5.
Figure 8:
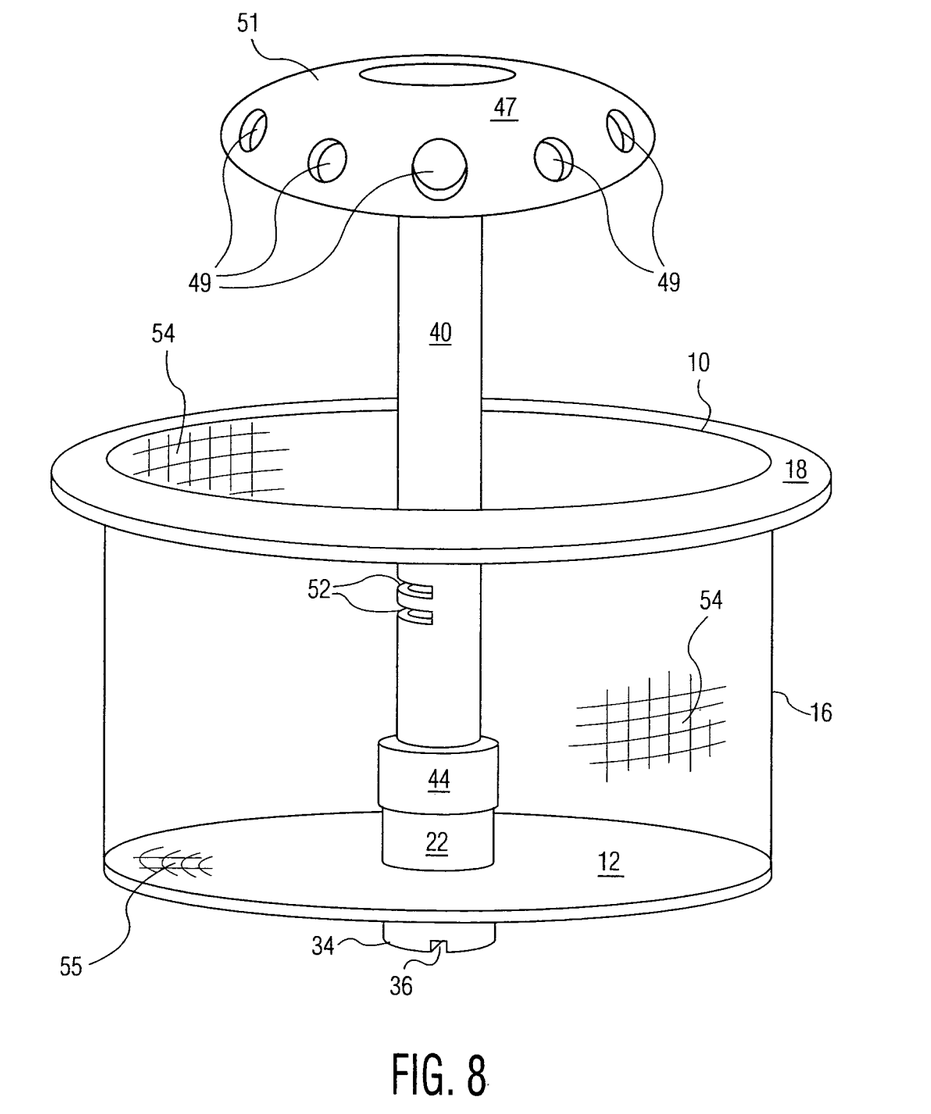
FIG. 8 illustrates an front perspective view of an alternative embodiment of the skimmer basket alarm apparatus of the present invention as shown in FIG. 5 shown installed extending through the bottom of a skimmer basket.

The unique construction of the present invention is designed to be used with a skimmer basket 10 commonly positioned within the filtration system of most types of residential and commercial pool configurations including but not limited to in-ground and above-ground designs. Such skimmer baskets include a plurality of apertures or screens therein such that water can pass downwardly through apertures defined in the skimmer basket 10 while any debris located in the pool water or on the surface of the water such as leaves, twigs, trash and the like, can be accumulated therein. When a skimmer basket 10 become filled with debris it will clog and prevent water flow therethrough which can cause basket rupture or be damage due to the pressure of the water traveling through the filtration system. Such undesirable blockage can also damage the pool pump because the blockage restricts full fluid flow with respect thereto. The present invention provides a means for continuously venting such skimmer baskets while at the same time including a detachable alarming stem portion. This construction is also fully usable with conventional vacuum systems using an attachable vacuum plate device(not shown) normally designed to be placed horizontally in abutment with the uppermost edge of the basket side wall. In the configuration shown in FIG. 2 a sound amplifying means is attached to the top of the main tubular section 42 which preferably defines upper apertures 49 in the upper portion thereof which allow air to pass therethrough which for generating an alarm sound whenever the skimmer basket is at least partially clogged due to the change in air flow through the sound amplifying means.

Installation of the apparatus of the present invention is provided initially by removing the skimmer basket 10 and drilling a bottom hole 14 in the bottom portion 12 thereof This hole 14 will provide a location for detachable securement of the detachable fitting assembly 20 extending therethrough. Such skimmer baskets normally define a plurality of apertures in the bottom 12 and in the side walls 16 thereof which allows water to pass therethrough but prevents debris from passing therethrough when the apparatus is used in the pool cleaning mode. The side wall 16 extends upwardly to an uppermost edge 18 normally extending circumferentially around the uppermost edge of the generally rounded side wall area 16.

The apparatus of the present invention includes two main assemblies. Firstly, the detachable fitting assembly 20 of the stem 40 is detachably securable with respect to the bottom hole 14 defined in the bottom 12 of basket 10. Secondly, a detachable alarm stem 40 can be secured to the upper end of the assembly 20 which preferably is configured as a lower adapter portion 22 of the detachable fitting assembly 20.

Structurally the detachable fitting assembly 20 will include a lower adapter 22 which is adapted to extend through and engage the bottom hole 14 of the skimmer basket 10. Lower adapter portion 22 preferably includes lower adapter male threads 28 adapted to extend through the bottom hole 14. The lower cap member 34 preferably defines a lower cap bore 37 extending longitudinally therethrough and lower cap female threaded section 38 is defined within the lower cap bore 37. With this design the female threads 38 in the lower cap bore 37 are adapted to accept and engage with respect to the lower adapter male threads 28 which extend through the bottom hole 14 into engagement therewith. Thus, turning of the lower cap member 34 will cause the female threads 38 in the lower cap bore 37 to fully engage and detachably lock with respect to the lower adapter male threads 28 extending downwardly from the lower adapter 22 through the bottom hole 14. This rotation of the lower cap member 34 which causes securement of the detachable fitting assembly 20 with respect to the bottom 12 of basket 10 while extending through the bottom hole 14 is reversible to facilitate disengagement thereof. As such, the detachable fitting assembly 20 can be detachably secured from a skimmer basket 10 to facilitate ease of maintenance or replacement of the skimmer basket 10 while making use of the alarm and vent apparatus of the present invention when the basket is replaced or when a new basket is utilized. Such skimmer baskets 10 can become damaged because pool water can be a very harsh environment for such baskets, and the substantial suction created in the pool filtration system by the pump which often tends to break the relatively thin-walled skimmer baskets 10 having many apertures therein to facilitate water passing through and, as such, this construction makes such skimmer baskets inherently fragile when utilized.

Therefore, when the lower cap member 34 is tightened in engagement with the lower adapter male threads 28 of the lower adapter 22, the detachable fitting assembly 20 is fully detachably secured with respect to the bottom 12 of the skimmer basket 10. At this point the stem 40 can be secured with respect to the detachable fitting assembly 20. The detachable stem 40 includes a main tubular section 42 along with a lower stem fitting 44 which is engageable with respect to the upper portion of the detachable fitting assembly 20 and an upper stem fitting 47. The lower stem fitting 44 preferably includes a lower stem male thread means 45. The lower adapter 22 preferably defines lower adapter female threads 30 in the upper portion thereof which are detachably engageable with respect to the lower stein male thread means 45 to facilitate detachment and/or attachment of the detachable stem 40 with respect thereto.

The configuration of the detachable stem 40 includes the upper stem fitting 47 which is preferably T-shaped as shown in FIGS. 1-4, and includes a central bore extending therethrough. Stem 40 can also act as a means to facilitate removal and/or replacement of the basket when attached to the apparatus of the present invention. The alternative construction shown in FIG. 5-8 makes use of a rounded sound producing means which can also operated as a grasping means similarly. Sound is produced through the plurality of apertures located within the arcuate surface of the sound producing means.

In the preferred configuration of the present invention a central bore will extend through all sections of the construction which will provide full fluid flow communication between the outlets of the stem 40 and a plurality of lower cap apertures 36 defined in the lower cap member 34. Thus, air is free to flow between the apertures in the lower cap aperture 36 through the fitting conduit 21 defined longitudinally through the entire length of the detachable fitting assembly 20 and into and through the alarm conduit 50 defined longitudinally through the entire length of the detachable stem 40 in order to exit through the outlets 49 defined in the uppermost portion thereof.

In this manner full fluid flow communication will be provided between the area below the bottom 12 of skimmer basket 10 and the outlets 49 in the detachable stem 40. This continuous capability for fluid flow communication through this series of conduits provides venting for the skimmer basket 10 to minimize damaging thereof when a substantial amount of debris has accumulated therewithin and will generate an alarm preferably being audible to indicate excessive debris has been accumulated in the basket and basket cleaning should immediately be initiated.

In the preferred construction of the present invention the lower adapter 22 of the detachable fitting assembly 20 will comprise a single fitting as shown in the figure of the present invention. The lower portion of the lower adapter 22 will define the lower adapter male threads 28 whereas the upper portion of lower adapter 22 will preferably define the lower adapter female threads 30 thereon. In the preferred configuration of the present invention the upper stem fitting 47 will be T-shaped to amplify the alarm, which in and of itself, also facilitates grasping the alarm by a user to aid in lifting the skimmer basket 10 for cleaning of the debris therefrom periodically. In use the detachable stem 40 will be maintained in position detachably engaged with respect to the detachable fitting assembly 20 therebelow. This stem 40 can be removed from engagement with respect to the detachable fitting assembly 20 in order to allow the use of a vacuum plate device in a conventional manner mounted extend across the upper edge 18 of skimmer basket 10. Such external auxiliary vacuum configurations normally include a plate (not shown) which extends horizontally across the upper portion of the skimmer basket 10 in engagement with respect to the upper edge 18 thereof. A vacuum will then be created within the interior portion of the skimmer basket which will allow a hose (not shown) to be connected to this plate to act as a handheld vacuuming attachment (not shown) or similar appliance to facilitate removal of specific debris or specific areas of the pool. For this purpose it is necessary that the detachable stem 40 be removed such that it is possible to attach the vacuum plate to the upper edge 18 of skimmer basket 10. Once operation of the external vacuum plate apparatus has been concluded, then the detachable stem 40 can be again be threaded into the detachable fitting assembly 20 such that the alarm can be used in a conventional manner to facilitate removal of the skimmer basket 10 when needed for cleaning thereof or for being maintained in place to provide an alarm when the skimmer basket becomes clogged with a significant amount of debris.

The alarm provided by the present invention is a unique combination of the inclusion of relatively lower cap holes or a single slit 36 defined in the lower cap 34 which communicate through the conduit extending through the apparatus of the present invention upwardly to the outlets 49. This audible alarm will, in some embodiments, be somewhat similar to the sound of gurgling whenever movement of water through the skimmer basket itself is substantially blocked and the amount of air which attempts to be drawn through the lower cap apertures or slit 36 increases significantly. The alarm sound can also be a tone created by the sound amplifying means 51 which could be some form of musical instrument possibly designed specifically for this purpose. In some embodiments the main tubular section 42 will include side vent holes or slits 52 preferably two to four in number and spaced as shown in the figure of the present application. In the embodiment shown in the Figures there are two apertures or slits in the side wall of the main stem section 42. These holes or slits are placed above the lower stem fitting 44. The placement of these holes or slits is slightly below the water level whenever the apparatus of the present invention is affixed to a skimmer basket and has the advantage of properly controlling the alarm sound despite the various difference horsepower ratings commonly used for pumping. These side vent holes or slits 52 in the vertical alarm section prevent premature activation of the alarm apparatus which can occur whenever utilized with higher horsepower pumps.

One of the important advantages of the present invention is the use of the detachable stem 40 as an after-market item with any of a variety of different configurations of skimmer baskets 10 which in and of itself provides venting and greatly facilitates removal of the basket 10 for cleaning while at the same time facilitating use of the apparatus with respect to external vacuum attachments including a plate which attach extending across the upper edge 18 of the skimmer baskets 10 during use. This combination of features and conveniences is not present in any construction in the prior art. Also, because of the action of gravity, the weight of the thermoplastic alarm will prevent the basket from floating within the skimmer housing.

To facilitate ease of attachment and detachment of the lower cap member 34 to the lower adapter male threads 28 of the detachable fitting assembly 20 a washer member 32 preferably of a non-metallic, thermoplastic material, to avoid deterioration of said washer which can be caused by the harsh pool chemical environment, is included. This washer 32 provides sealing enhancement while at the same time facilitates both attachment and detachment.

All of the parts of the apparatus of the present invention are preferably formed of thermoplastic fittings, PVC [polyvinyl chloride] having been determined to be the preferred choice, which can be of any size, but one half-inch diameter tubing has been determined to the preferred configuration for most skimmer basket sizes. Such thermoplastic materials are also highly chemical resistant which is an important advantage of the present invention also.

Although the preferred embodiments of the apparatus of the present invention is as depicted in the Figures, the alarm may also be a molded thermoplastic whistle or other sound amplifying device 51 attached to the top of the vertical stem as derived from the Japanese Bird Whistle of ancient design, which instead of the gurgling sounds made by the preferred embodiment of the alarm, makes a whistling alarm caused by the passage of air through the orifice in the bottom of the whistle. A conventional or specially designed musical instrument can also be used as sound amplifying means 51.

Although the preferred embodiment of the alarm is as depicted in the Figures, the alarm may also be a molded thermoplastic musical instrument attached to the top of the vertical stem known as the Chinese Shang of ancient design, or as reinterpreted in similar contemporary designs, which instead of the gurgling sounds made by the preferred embodiment of the alarm, makes a musical note or notes as an alarm whose pitch is determined by the diameter of the reeds, pipes or other means inserted into the globular body of the Shang, or other globular embodiment.

The unique configuration shown in the Figures illustrates a version of this unit which includes a slit in the bottom cap and slits in the stem. It should be appreciated that the purpose of the slits 36 in the cap 34 is to allow the immediate introduction of air at the exact moment that the basket becomes clogged with debris starting at either opening in the T-fitting 47. It is important that this becomes immediate in order to avoid damage to the basket. This introduction of air provides a vacuum break in the skimmer suction system. The air starts at the T-shaped member 47 and travels down through the stem 40 and exits the cap 34 through the slits 36. This allows air to be introduced which mingles with the water adjacent the interior of the cap 34. A loud gurgling sound is provided which travels back up the stem and exits through the openings 49 of the T-shaped fitting or grasping means 47 which can act as an alarming means in accordance with the construction of the present invention.

During this time the gurgling water and the air mixing is being amplified because it is being forced to be confined within the interior of the rigid pipe stem 42 and it is amplified further as it exits an opening 49. It echoes off the interior of the plastic skimmer housing wall. Since no other room is available for exiting of the rushing air, the sound travels out through the skimmer throat such that it can be heard at a distance of as far as 50-60 feet in all directions. This construction thus emits a signal which acts as an alarm which gives warning to service personnel that the skimmer basket needs to be emptied and/or cleaned.

Further in regard to the Figures the two slits identified as 52 in this figure are designed for the purpose of postponing any possible generation of an alarm when the basket is not partially clogged. A premature alarm can occur if slits 52 are not used since this undesirable premature alarm can be caused by the use of an oversized pump having high horsepower within the venting system. These slits 52 allow a portion of the water above the basket 10 to be recycled down through the alarm 40 resulting in flooding of the interior of the cap and postponing the introduction of air. At the same time this construction will keep the basket and pump safe from damage. At the instant that the apertures in the basket become clogged along with the stem vent holes 52 the alarm will generate an alarm signal.

It should be appreciated that this configuration shown in this specification is only one specific design for the sound amplifying means 51. Many other configurations can be included such as a molded thermoplastic globular or similarly shaped device attached to the top of the stem in place of the T-shaped member. These other constructions will emit a different sound other than the gurgling such as the sound of a whistle or a high pitched screech or a musical note or tone. These sounds can be generated by the resistance of air movement through the openings in the globular or similar attachment at the top of the stem 40. Reducing the openings 49 in the globular or similar shape 51 to a smaller aperture than the size of the aperture slit 36 will produce an increased resistance to the movement of air resulting in the production of an audible sound in the aperture in the globular or other similarly shaped alarm device 51 above the water line. The air entering the apertures in the globular sound device 51 will resist the vacuum break when the basket becomes clogged and, thus, will emit a whistle or other sound responsive to the hole size and the particular placement of the globular or other similar device 51 in the specifically applicable construction.

It should be particularly appreciated that the configuration of the skimmer basket 10 of the present invention does not normally include any type of an aperture in the bottom 12 thereof. As such, the present invention provides an aftermarket add-on vented alarming apparatus which is usable with a basket 10 by drilling or otherwise forming a bottom hole 14 preferably centrally located within the bottom 12 of skimmer basket 10. This construction facilitates the formation of a fully vented pool skimmer basket 10 which has an alarming means for indicating the need to clean the basket to remove debris from blocking the apertures defined therein. These apertures preferably include side wall perforations 54 and bottom perforations 55. These are shown schematically in the Figures of this detailed description in a limited area and it should be appreciated that most such skimmer baskets include these perforations throughout the entire surface except perhaps along the intersections between the walls and other panels such as the edge or floor thereof That is, the side walls 16 usually include the side wall perforations 54 throughout all portions thereof and the bottom perforations 55 are defined throughout the entire surface of the bottom 12 of the skimmer basket 10. In this manner maximum water flow through the skimmer basket is provided in such a manner as to enhance the removal of debris from the pool water. In the drawings, however, we have only shown the perforations to a limited extent but it should be appreciated that all or any portion of the bottom 12 and/or the side wall 16 can include such perforations.

Further defined in the structure set forth in the drawings of the present invention, preferably the detachable stem 40 will define a main channel 56 extending longitudinally therethrough. This channel will provide venting between a location below the bottom 12 of skimmer basket 10 to a position above the upper edge 18 of skimmer basket 10. This venting is important to allow water flow through the skimmer basket to prevent damaging thereof whenever it is at least substantially clogged with debris.

This main channel 56 will extend from a lower opening 58 defined in stem 40 and an upper opening 60 defined therein. As such, the lower opening 58 and the upper opening 60 and the main channel 56 are all in fluid flow communication with respect to one another. In the preferred configuration shown in the present invention the lower portion of the detachable stein 40 will comprise a lower stem fitting 44. This lower stem fitting 44 will include lower stem male threads 45 extending downwardly therefrom. The detachable fitting assembly of the present invention will include the lower adapter 22 which defines a lower opening 58 therein which is actually the lower opening of the stem 40 since the lower stem fitting 44 is deemed to be the lower portion of the stem 40.

Figure 1:
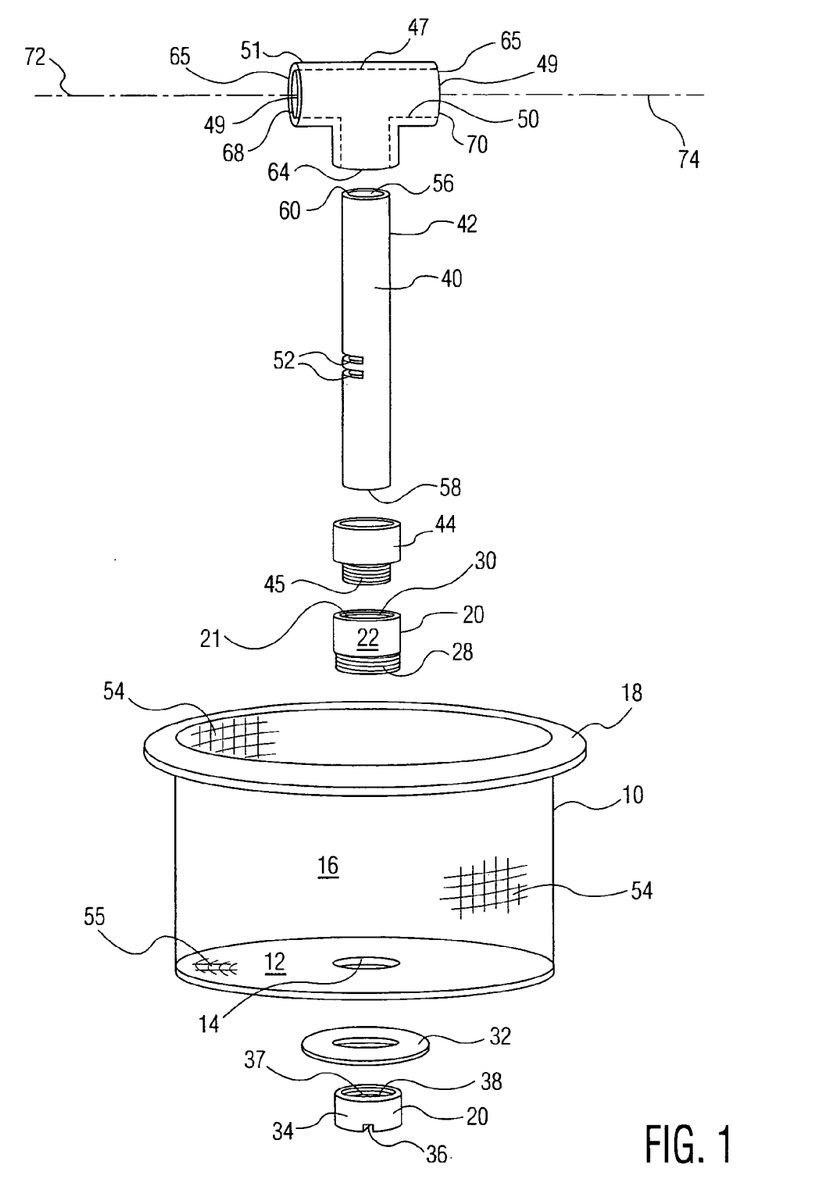
FIG. 1 illustrates an exploded front perspective view of an embodiment of the skimmer basket alarm apparatus of the present invention in vertical alignment with a skimmer basket.

The sound amplifying means 51 in this embodiment will include the sound channel means 50 extending therethrough. The sound amplifying means 51 will also define a sound inlet 64 and at least one outlet 49 therein. The outlets 49 and the sound inlet 64 and the sound and air conveying channel 50 will all be in fluid flow communication with respect to one another. As such, when an increase in flow of air traveling through the main tubular section 42 of the detachable stem 40 occurs, it will change the airflow through the sound inlet 64 defined in sound amplifying means 51 and will cause the sound alarm to be generated. In the preferred configuration the sound amplifying means 51 will be in the form of a T-shaped connection with a single downwardly facing sound inlet 64 and two oppositely positioned outlets 49, namely, the first sound aperture 68 and a second sound aperture 70. The first sound aperture 68 will allow sound to travel outwardly therefrom along a first air flow axis 72. The second sound aperture 70 will allow sound to travel outwardly therethrough along a second airflow axis 74 as shown in FIG. 1. The first axis 72 and the second axis 74 will preferably be coincident with respect to one another and sound will be allowed to travel outwardly through the respective apertures in direct diametrically opposite directions along the upper generally horizontally extending portion of the T-shaped sound amplifying means. In this manner a vibrant sound signal can be emitted in all directions.

It should be appreciated that the lower stem fitting 44 is an optional piece in the present invention. The affixing of this lower stem fitting 44 directly to the main tubular section 42 allows the assembled structure of the lower stem fitting 44 and the main tubular section 42 and the upper stem fitting 47 to be secured to the lower adapter 22 after the lower adapter has been secured in the hole 14 by being attached to the lower cap member 34 therebelow. Thus, in assembly, initially the fitting conduit 21 will be positioned extending through the hole 14 formed in the bottom 12 of the basket 10 and the lower cap member 34 will be secured thereto. Once the lower adapter 22 is secured to the skimmer basket bottom 12 in this manner the detachable stem 40 and the lower stem fitting 44 attached thereto optionally along with the sound amplifying means 51 can be threadably secured to the lower adapter female threaded section 30. This facilitates construction and maintenance thereof.

However, it is entirely possible that the lower stem fitting 44 can be deleted in some constructions such that the lower adapter 22 is fixedly secured to the detachable stem 40 and the sound amplifying means 51. In this manner the lower adapter male threaded section 28 will be urged through the formed bottom hole 14 in skimmer basket bottom 12 and will be held in place while the lower cap member 34 is secured thereto. As such, it is quite obvious that the inclusion or the deletion of the lower stem fitting 44 provides two different constructions each of which will accomplish the basic purpose of the present invention.

While particular embodiments of this invention have been shown in the drawing and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. A vented alarming apparatus for use with a pool skimmer basket having a basket bottom, and a basket side wall extending upwardly therefrom and a basket upper edge which together define a chamber therewithin wherein the basket bottom and basket side wall define perforations therein to facilitate filtration skimming as pool water passes therethrough, said vented alarming apparatus includes:
   A. a detachable stem securable to the basket bottom in a position extending therethrough, said detachable stem being at least partially hollow therewithin to define a main channel means extending therethrough, said detachable stem further defining a lower opening therein and an upper opening therein in fluid flow communication with respect to one another and with respect to said main channel means, said lower opening being positioned below the chamber and below the basket bottom responsive to securement of said detachable stem extending through the basket bottom, said upper opening means being positioned above the basket bottom to facilitate venting of the basket responsive to debris being fathered within the chamber and blocking fluid flow through the perforations in the basket bottom and basket side wall, said detachable stem further comprising a detachable fitting assembly secured to said detachable stem to facilitate defining of said main channel means extending through said detachable stem, said detachable fitting assembly being positioned defining said lower opening of said detachable stem at a position below the basket bottom responsive to attachment of the detachable stem with respect to the basket bottom and extending therethrough;

B. a sound amplifying means defining a sound channel means extending therethrough, said sound amplifying means including a sound inlet means and at least one sound outlet means, said sound amplifying means being attached to said detachable stem with said sound inlet means thereof in fluid flow communication with respect to said upper opening of said detachable stem and said main channel means, said sound amplifying means being responsive to receiving a sound signal passing thereto from said detachable fitting assembly responsive to an increase in airflow through said sound channel means thereof to generate an alarm signal.

2. A vented alarming apparatus for use with a pool skimmer basket as defined in claim 1 wherein said sound amplifying means is responsive to amplify a sound signal traveling thereto from said detachable fitting assembly responsive to an increase in airflow through said sound channel means thereof to generate an amplified audible alarm signal.

3. A vented alarming apparatus for use with a pool skimmer basket as defined in claim 1 wherein said sound outlet means of said sound amplifying means is oriented at approximately ninety degrees with respect to said sound inlet means thereof to allow sound traveling through said sound outlet means thereof to travel in a direction oriented at approximately ninety degrees with respect to the direction of sound traveling through said sound inlet means thereof.

4. A vented alarming apparatus for use with a pool skimmer basket as defined in claim 1 wherein said sound amplifying means is T-shaped and wherein said sound outlet means includes:

A. a first sound aperture; and

B. a second sound aperture oppositely located from said first sound aperture, said second sound aperture positioned to allow sound to exit therefrom is a direction diametrically oppositely from sound exiting through said first sound aperture to enhance audible alarm signaling therearound.

5. A vented alarming apparatus for use with a pool skimmer basket as defined in claim 4 wherein said first sound aperture defines a first air flow axis which allows sound to exiting outwardly therealong and wherein said second sound aperture defines a second air flow axis which allows sound to exit outwardly therealong, said first air flow axis and said second air flow axis being coincident with one another wherein sound can travel outwardly therealong, respectively, in directly opposed directions.

6. A vented alarming apparatus for use with a pool skimmer basket as defined in claim 1 wherein said sound amplifying means extends above the basket upper edge to facilitate alarm generating and basket venting responsive to debris accumulation within the basket chamber.

7. A vented alarming apparatus for use with a pool skimmer basket as defined in claim 6 wherein said sound amplifying means includes a grasping means section to facilitate grasping of the detachable stem and the skimmer basket attached thereto to facilitate removal thereof as needed.

8. A vented alarming apparatus for use with a pool skimmer basket as defined in claim 1 wherein said detachable fitting assembly is positioned extending through the basket bottom and is detachably attached with respect thereto.

9. A vented alarming apparatus for use with a pool skimmer basket as defined in claim 8 wherein the basket bottom defines a bottom aperture therein to facilitate attaching of said detachable fitting assembly to the basket while extending therethrough.

10. A vented alarming apparatus for use with a pool skimmer basket as defined in claim 9 wherein said detachable fitting assembly includes:

A. a lower adapter extending outwardly therefrom adapted to be positioned extending through said bottom aperture of the basket bottom to facilitate attachment of said detachable fitting assembly to the basket bottom; and B. a lower cap member being attachable to said lower adapter below the basket bottom and below the bottom aperture to detachably secure said detachable stem to the pool skimmer basket bottom, said lower cap member defining a lower cap aperture means therein in fluid flow communication with said main channel means through said lower opening.

11. A vented alarming apparatus for use with a pool skimmer basket as defined in claim 10 wherein said detachably fitting assembly includes a washer member positionable between said lower cap member and the basket bottom to facilitate attachment between said lower cap member and said lower adapter positioned extending through said bottom aperture.

12. A vented alarming apparatus for use with a pool skimmer basket as defined in claim 11 wherein said washer member is formed of a thermoplastic material to facilitate attachment between said lower cap member and said lower adapter positioned extending through the bottom aperture by providing a bearing surface therebetween.

13. A vented alarming apparatus for use with a pool skimmer basket as defined in claim 10 wherein said lower adapter includes a lower adapter male threaded section and wherein said lower cap member includes a lower cap female threaded section, said lower adapter male threaded section and said low cap female threaded section being threadingly engagable with each other to facilitate detachable securement between said lower adapter and said lower cap member at a position immediately below the bottom aperture defined in the basket bottom.

14. A vented alarming apparatus for use with a pool skimmer basket as defined in claim 10 wherein said detachable stem includes a lower stem male thread means extending downwardly therefrom and wherein said lower adapter includes lower adapter female thread means, said lower stem male thread means being engagable with said lower adapter female thread means to allow attachment of said detachable stem to the skimmer basket after attachment of said lower adapter to said lower cap member while extending through the bottom hole.

15. A vented alarming apparatus for use with a pool skimmer basket as defined in claim 10 wherein said lower opening comprises a lower opening slit defined in said lower cap member.

16. A vented alarming apparatus for use with a pool skimmer basket as defined in claim 1 wherein said detachable stem extends upwardly beyond the basket upper edge with said sound amplifying means attached thereabove to facilitate alarming and venting of the pool skimmer basket.

17. A vented alarming apparatus for use with a pool skimmer basket as defined in claim 1 wherein said detachable stem includes main stem side vent holes for facilitate alarm generation responsive to accumulation of excess debris within a skimmer basket.

18. A vented alarming apparatus for use with a pool skimmer basket as defined in claim 1 wherein said detachable stem means is tubular.

19. A vented alarming apparatus for use with a pool skimmer basket as defined in claim 1 wherein said sound amplifying means is rounded and wherein said sound outlet means comprises at least two sound apertures defined therewithin.

20. A vented alarming apparatus for use with a pool skimmer basket having a basket bottom, and a basket side wall extending upwardly therefrom and a basket upper edge which define a chamber therewithin wherein the basket bottom and basket side wall define perforations therein to facilitate filtration skimming as pool water passes therethrough, said vented alarming apparatus includes:
 A. a detachable stem securable to the basket bottom in a position extending therethrough, said detachable stem being at least partially hollow therewithin to define a main channel means extending therethrough, said detachable stem extending upwardly beyond the basket upper edge to facilitate alarming and venting of the pool skimmer basket, said detachable stem further defining a lower opening therein and an upper opening therein in fluid flow communication with respect to one another and with respect to said main channel means, said lower opening being positioned below the chamber and below the basket bottom, said upper opening means being positioned above the basket bottom to facilitate venting responsive to debris being positioned within the chamber and blocking fluid flow through the perforations in the basket bottom and basket side wall, said detachable stem further comprising a detachable fitting assembly secured to said detachable stem to facilitate defining of said main channel means extending through said detachable stem, said detachable fitting assembly being positioned defining said lower opening of said detachable stem at a position below the basket bottom responsive to attachment of the detachable stem with respect to the basket bottom and extending therethrough, said detachable fitting assembly being positioned extending through the basket bottom and attached with respect thereto, the basket bottom defining a bottom aperture therein to facilitate attaching of said detachable fitting assembly to the basket while extending therethrough, and wherein said detachable fitting assembly includes:
  (1) a lower adapter extending outwardly therefrom adapted to be positioned extending through said bottom aperture of the basket bottom to facilitate attachment of said detachable fitting assembly to the basket bottom;
  (2) a lower cap member being attachable to said lower adapter below the basket bottom and below the bottom aperture to detachably secure said detachable stem to the pool skimmer basket bottom, said lower cap member defining a lower aperture means therein to facilitate fluid flow communication therethrough;
  (3) a washer member of thermoplastic material positionable between said lower cap member and the basket bottom to facilitate attachment between said lower cap member and said lower adapter positioned extending through said bottom aperture; and
 B. a sound amplifying means defining a sound channel means extending therethrough, said sound amplifying means including a sound inlet means and at least one sound outlet means, said sound amplifying means being attached to said detachable stem with said sound inlet means thereof in fluid flow communication with respect to said upper opening of said detachable stem to facilitating monitoring of air flow through said main channel means, said sound amplifying means being responsive to increased airflow through said sound channel means thereof to amplify an audible alarm signal received therein, said sound amplifying means extending above the basket upper edge to facilitate generating of an audible alarm and facilitate basket venting, said sound amplifying means further including a grasping means section to facilitate grasping and holding of the detachable stem and the skimmer basket attached thereto to facilitate removal thereof for servicing as needed, said sound outlet means of said sound amplifying means being oriented at ninety degrees with respect to said sound inlet means thereof such that the flow of sound exiting said sound channel means through said sound outlet means is traveling in a direction oriented at approximately ninety degrees with respect to the direction of flow of sound traveling through said sound inlet means, said sound outlet means including:
  A. a first sound aperture defining a first air flow axis directed outwardly therefrom; and
  B. a second sound aperture oppositely located from said first sound aperture, said second sound aperture positioned to allow sound to exit therefrom is a direction diametrically oppositely from sound exiting through said first sound aperture to enhance audible alarm signaling, said second sound aperture defining a second air flow axis directed outwardly therefrom, said first air flow axis and said second air flow axis being coincident with one another and wherein sound exiting through said first sound aperture travels outwardly therefrom in a direction directly opposite from the sound exiting from said second sound aperture.

\* \* \* \* \*